United States Patent
Haddadin

(10) Patent No.: US 11,203,119 B2
(45) Date of Patent: Dec. 21, 2021

(54) METHOD FOR INSERTING AN OBJECT INTO AN OBJECT-RECEIVING AREA USING A ROBOT MANIPULATOR

(71) Applicant: Franka Emika GmbH, Munich (DE)

(72) Inventor: Sami Haddadin, Hannover (DE)

(73) Assignee: Franka Emika GmbH, Munich (DE)

( * ) Notice: Subject to any disclaimer, the term of this patent is extended or adjusted under 35 U.S.C. 154(b) by 400 days.

(21) Appl. No.: 16/095,626

(22) PCT Filed: Apr. 24, 2017

(86) PCT No.: PCT/EP2017/059650
§ 371 (c)(1),
(2) Date: Oct. 22, 2018

(87) PCT Pub. No.: WO2017/186637
PCT Pub. Date: Nov. 2, 2017

(65) Prior Publication Data
US 2019/0126483 A1    May 2, 2019

(30) Foreign Application Priority Data

Apr. 24, 2016  (DE) ...................... 10 2016 004 942.1
Apr. 27, 2016  (DE) ...................... 10 2016 107 842.5

(51) Int. Cl.
*B25J 9/16*    (2006.01)
*G05B 19/402*  (2006.01)

(52) U.S. Cl.
CPC ........... *B25J 9/1687* (2013.01); *B25J 9/1612* (2013.01); *B25J 9/1633* (2013.01); *B25J 9/1669* (2013.01);
(Continued)

(58) Field of Classification Search
CPC ........................................................ B25J 9/16
See application file for complete search history.

(56) References Cited

U.S. PATENT DOCUMENTS 4,707,907 A   11/1987  Ivanov
2008/0267737 A1  10/2008  Hatanaka et al.
(Continued)

FOREIGN PATENT DOCUMENTS

CN   104602873 A   5/2015
CN   104625676 A   5/2015
(Continued)

OTHER PUBLICATIONS

R.L.A Shauri et al. "Sensor integration and fusion for autonomous screwing task by dual manipulator hand robot"; 9 pages (Year: 2012).*
(Continued)

*Primary Examiner* — Kira Nguyen
(74) *Attorney, Agent, or Firm* — Hoffmann & Baron, LLP

(57) ABSTRACT

A method and robot for inserting an object into an object-receiving area using an actuator-driven robot manipulator of a robot, wherein the robot manipulator has an effector at its distal end, designed to receive and/or grip the object, and wherein an inserting trajectory T is defined for the object-receiving area and the object to be inserted, and a target orientation $O_{soll}(\vec{R}_T)$ of the object to be inserted is defined along the inserting trajectory T for locations $\vec{R}_T$ of the inserting trajectory T including the following operations: receiving/gripping the object using the effector, moving the object using the robot manipulator along the inserting trajectory $\vec{T}$ into the object-receiving area while continuously performing predetermined tilting motions of the object that are closed and cyclical motions relative to the target orientation $O_{soll}(\vec{R}_T)$ via a force-regulated and/or impedance-regulated control of the robot manipulator until a specific threshold condition G1 for a torque acting on the effector and/or a force acting on the effector is reached or exceeded,
(Continued)

and/or a provided force/torque signature and/or a position/speed signature on the effector is reached or exceeded, which indicate(s) that the object has been completely successfully inserted into the object-receiving area within specified tolerances; releasing the object by the effector; and moving the effector away from the object-receiving area along the exit trajectory A using the robot manipulator.

14 Claims, 1 Drawing Sheet

(52) U.S. Cl.
CPC .. *G05B 19/402* (2013.01); *G05B 2219/40032* (2013.01); *Y02P 90/02* (2015.11)

(56) References Cited

U.S. PATENT DOCUMENTS

| | | | |
|---|---|---|---|
| 2008/0312769 A1* | 12/2008 | Sato | B25J 9/1687 700/249 |
| 2011/0270444 A1* | 11/2011 | Nagata | B25J 9/1633 700/258 |
| 2012/0030463 A1* | 2/2012 | Li | H04L 63/123 713/167 |
| 2012/0283875 A1 | 11/2012 | Klumpp et al. | |
| 2012/0317535 A1 | 12/2012 | Schmirgel et al. | |
| 2014/0135987 A1 | 5/2014 | Maischberger et al. | |
| 2015/0174760 A1 | 6/2015 | Fukuda et al. | |
| 2015/0248116 A1* | 9/2015 | Kawaguchi | B25J 9/1687 700/245 |
| 2015/0306716 A1* | 10/2015 | Neumeier | B25J 13/087 29/464 |
| 2016/0052135 A1* | 2/2016 | Motoyoshi | B25J 9/1633 29/281.6 |

FOREIGN PATENT DOCUMENTS

| | | |
|---|---|---|
| DE | 3614105 A1 | 10/1986 |
| DE | 102009058607 A1 | 6/2011 |
| DE | 102010012598 A1 | 9/2011 |
| EP | 1422020 A1 | 5/2004 |
| GB | 2174360 A | 11/1986 |
| JP | 61-265226 A | 11/1986 |
| JP | 2010-58202 A | 3/2010 |
| JP | 2011-11315 A | 1/2011 |
| JP | 2015226967 A | 12/2015 |
| WO | WO 2013007565 A2 | 1/2013 |

OTHER PUBLICATIONS

Richard Paul, "Robots, Models, and Automation", IEEE, Jul. 1979, pp. 19-27.
Schweigert, Von Uwe, "Vibrationsunterstützung ermöglicht Präzisionsmontage", Technische Rundschau, vol. 84, No. 6, Feb. 7, 1992, pp. 48-52.
English translation of the International Preliminary Report on Patentability dated Nov. 8, 2018 for International Application No. PCT/EP2017/059650.
English-language Summary of Office Action issued in Chinese Patent Application No. 201780024641.2 dated Jan. 21, 2021.

* cited by examiner

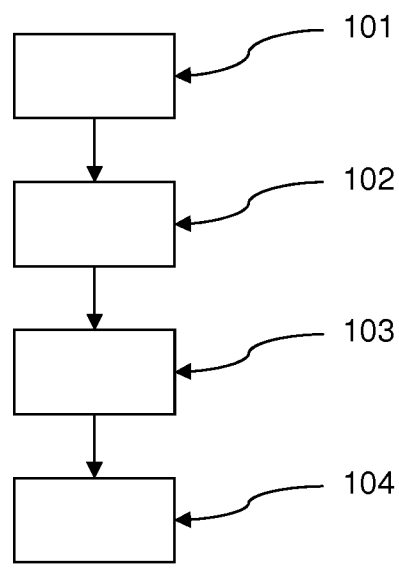

METHOD FOR INSERTING AN OBJECT INTO AN OBJECT-RECEIVING AREA USING A ROBOT MANIPULATOR

CROSS-REFERENCE TO RELATED APPLICATIONS

This application is the U.S. National Phase of International Patent Application No. PCT/EP2017/059650, filed on 24 Apr. 2017, which claims benefit of German Patent Application No. 10 2016 004 942.1, filed on 24 Apr. 2016, and German Patent Application No. 10 2016 107 842.5, filed on 27 Apr. 2016, the contents of which are incorporated herein by reference in their entirety.

BACKGROUND

Field

The invention relates to a method of inserting an object into an object-receiving area using a robot manipulator. The invention further relates to a robot manipulator.

Related Art

Today, robots with movable parts (one or more robot manipulators, etc.) are increasingly used in areas where the robots complete various tasks.

SUMMARY

The task of the invention is to provide an easy and robust method of inserting an object into an object-receiving area using a robot manipulator. An additional task is to provide a robot manipulator designed and adapted to insert an object into an object-receiving area by a robot manipulator.

The invention follows from the features of the independent claims. Advantageous further developments and embodiments are the subject of the dependent claims. Additional features, application options, and advantages of the invention follow from the following description and from the explanations of example embodiments of the invention shown in the FIGURE.

A first aspect of the invention pertains to a method of inserting an object into an object-receiving area by an actuator-driven robot manipulator of a robot and of controlling the robot manipulator of a robot, wherein the robot manipulator has an effector at its distal end, designed to receive and/or grip the object, and wherein an inserting trajectory T is defined for the object-receiving area and the object to be inserted, and a target orientation $O_{soll}(\vec{R}_T)$ of the object to be inserted is defined along the inserting trajectory T for locations $\vec{R}_T$ of the inserting trajectory T.

The proposed method includes the following steps. In a first step, the effector is used to receive/grip the object. The effector features a mechanical interface that is required for these purposes, and it is advantageously formed as a gripper, as an artificial hand, a tool, etcetera.

In a second step, the object is moved using the robot manipulator along the inserting trajectory T into the object-receiving area while rotating/tilting motions are continuously exercised on the object relative to the target orientation $O_{soll}(\vec{R}_T)$ in a force-regulated and/or impedance-regulated manner until a specific threshold condition G1 for a torque acting on the effector and/or a force acting on the effector is reached or exceeded, and/or until a provided force/torque signature and/or a position/speed signature on the effector is reached or exceeded, which indicate(s) that the object has been completely successfully inserted into the object-receiving area within specified tolerances.

The robot manipulator is advantageously designed and adapted to move an assigned point of the effector (for instance, the so-called "tool center point", or TCP) or an assigned point of the object (for instance, its center of gravity or its geometric center) along a specified trajectory.

The inserting trajectory T is advantageously defined depending on the relative point of departure of the object arranged on the effector towards the object-receiving area, on the geometry of the object, and on the geometry of the object-receiving area.

The inserting trajectory T is typically a three-dimensional curve with one or multiple arches. Naturally, an inserting trajectory T in the form of a straight line is possible as well.

In a third step, the effector is used to release the object. Alternatively, the effector may simply release the object. Advantageously, the release involves continuous force-regulated and/or impedance-regulated rotating/tilting motions.

In a fourth step, the effector is moved away from the object-receiving area by the robot manipulator, along an exit trajectory A.

The success rate of the inserting process is significantly increased by the force-regulated and/or impedance-regulated rotating/tilting motions according to the invention of inserting the object into the object-receiving area of the effector.

An advantageous further development of the proposed method is characterized in that, in addition to the rotating/tilting motions, the effector also makes translational lateral motions with the subject of the second and third steps of the method along the inserting trajectory T/exit trajectory A. Through this measure, the aforementioned success rate of the inserting process or of the end form process is further increased.

In an advantageous variation of the method, the inserting trajectory T and the exit trajectory A are identical. In the typical general case, the inserting trajectory T and the exit trajectory A are advantageously selected to be different, which allows for the shortening of clock times by a time-optimized exit trajectory A.

An advantageous further development of the proposed method is characterized in that the rotating/tilting motions in the second and/or third steps rotate or tilt the subject around one, two, or three rotational or tilting axes relative to the target orientation $O_{soll}(\vec{R}_T)$, such that the rotation or tilting of the object around the respective rotational or tilting axis is by an angle in the range of up to ±1°, ±2°, ±5°, ±7°, ±10°, ±12°, ±15° to the target orientation $O_{soll}(\vec{R}_T)$.

The insertion of the object into the object-receiving area is advantageously accomplished by snapping, clicking, screwing, pressing, locking, sticking, soldering, or shrinking the object into place.

The object-receiving area has at least one opening that is accessible from the outside. Furthermore, this opening is dimensioned such that the object can be inserted through the opening into the object-receiving area. The method is therefore suitable in principle for inserting objects into an object-receiving area that meet the aforementioned conditions and that can be manipulated by a robot manipulator or its effector.

A further development of the method is characterized in that if during the receiving/gripping of the object by the effector an error should occur, the receiving/gripping of the object by the effector is repeated with different parameters for receiving/gripping the object. Such an error during the receiving/gripping of the object may be detected, for instance, by an effector and/or by force and/position sensors, optical sensors, ultrasound sensors, etc. that are arranged on the robot manipulator.

The modified parameters for receiving/gripping the object may be determined either in a trajectories plan for the robot manipulator or in a control and regulation unit of the robot or of the robot manipulator. An adjustment of a target trajectory for receiving/gripping the object may be made based on forces or moments sensed at the effector. Alternatively or in addition, relaxing an impedance regulator used for controlling the robot manipulator for the receiving/gripping of the object may reduce undesirable high process forces.

An advantageous further development of the method is characterized in that to the extent that an error should occur during the movement of the object using the robot manipulator along the inserting trajectory T into the object-receiving area, the movement of the object using the robot manipulator into the object-receiving area along a modified inserting trajectory T* and/or with modified parameters for the force-regulated and/or impedance-regulated rotation/tilting of the object relative to the target orientation $O_{soll}(\vec{R}_T)$ is repeated. Such an error occurring while moving the object may be detected, for instance, by an effector and/or by force and/position sensors, optical sensors, ultrasound sensors, etc. that are arranged on the robot manipulator. The modified parameters for the force-regulated and/or impedance-regulated rotation/tilting of the object relative to the target orientation $O_{soll}(\vec{R}_T)$ may be determined either in a trajectories plan for the robot manipulator or in a control and regulation unit of the robot or of the robot manipulator.

An advantageous further development of the method is characterized in that to the extent that errors, or errors other than the errors described above, should occur while the process takes place, a warning is issued and/or the process is aborted.

An advantageous further development of the method is characterized in that the rotating/tilting motions of the object correspond to closed or non-closed cyclical motions, in particular Lissajous figures in two to six dimensions or Fourier series or rectangular movements or Gaussian transformations, etc.

An advantageous further development of the method is characterized in that the translational lateral motions of the object around the inserting trajectory T correspond to closed or mon-closed cyclical motions, in particular Lissajous figures in two to six dimensions or Fourier series or rectangular movements or Gaussian transformations, etc.

An additional aspect of the invention pertains to a computer system with a data processing device, in which the data processing device is designed such that a method such as described above is executed on the data processing device.

An additional aspect of the invention pertains to a digital storage medium with electronically readable control signals, in which the control signals can interact with a programmable computer system such that a method such as described above is executed.

An additional aspect of the invention pertains to a computer program product with program code, stored on a machine-readable medium, for the execution of the aforementioned method when the program code is executed on a data processing device.

An additional aspect of the invention pertains to a computer program with program codes for executing the aforementioned method when the program runs on a data processing device.

An additional aspect of the invention relates to a robot with an actuator-driven robot manipulator, wherein the robot manipulator has an effector at its distal end, designed to receive and/or grip the object, and wherein a inserting trajectory T is defined for an object-receiving area and an object to be inserted into the object-receiving area, and target orientations $O_{soll}(\vec{R}_T)$ of the object to be inserted is defined along the inserting trajectory T for locations $\vec{R}_T$ of the inserting trajectory T, featuring a control unit, designed and adapted such that a method aforementioned can be executed.

Additional advantages, features, and details follow from the following description, in which—possibly with reference to the drawing—at least one example embodiment is described in detail. Identical, similar, and/or analog parts were given the same reference numbers.

BRIEF DESCRIPTION OF THE DRAWINGS

In the drawings:
FIG. 1 shows a flow chart of a proposed method.

DETAILED DESCRIPTION

FIG. 1 shows a flow chart of a proposed method of inserting an object into an object-receiving area by an actuator-driven robot manipulator of a robot and of controlling the robot manipulator, wherein the robot manipulator has an effector at its distal end, designed to receive and/or grip the object, and wherein a inserting trajectory T is defined for the object-receiving area and the object to be inserted, and a target orientation $O_{soll}(\vec{R}_T)$ of the object to be inserted is defined along the inserting trajectory T for locations $\vec{R}_T$ of the inserting trajectory T.

The method includes the following steps. In a first step 101, the effector is used to receive/grip the object.

In a second step 102, the object is moved using the robot manipulator along the inserting trajectory $\vec{T}$ into the object-receiving area while rotating/tilting the object relative to the target orientation $O_{soll}(\vec{R}_T)$ in a force-regulated and/or impedance-regulated manner until a specific threshold condition G1 for a torque acting on the effector and/or a force acting on the effector is reached or exceeded, and/or until a provided force/torque signature and/or a position/speed signature on the effector is reached or exceeded, which indicate(s) that the object has been completely successfully inserted into the object-receiving area within specified tolerances.

After the successful completion of step 102, a release of the object by the effector by way of force-regulated and/or impedance-regulated rotating/tilting motions follows in step 103.

Step 104 involves the moving away of the effector by the robot manipulator along a specified exit trajectory A.

Although the invention has been further illustrated and explained by way of preferred example embodiments, the invention is not limited by the disclosed examples and other variations can be derived therefrom by the person skilled in the art, without departing from the scope of the invention. It is thus understood that a plurality of possible variations exists. It is also understood that embodiments presented by way of example are really merely examples that should not

REFERENCE LIST

101-104 Steps of the method.

The invention claimed is:

1. A method of inserting an object into an object-receiving area by an actuator-driven robot manipulator of a robot and controlling the robot manipulator, wherein the robot manipulator has an effector at its distal end, designed to receive and/or grip the object, and wherein an inserting trajectory T is defined for the object-receiving area and the object to be inserted, and a target orientation $O_{soll}(\vec{R}_T)$ of the object to be inserted is defined along the inserting trajectory T for locations $\vec{R}_T$ of the inserting trajectory T, the method comprising the following steps:
   - 1.1 receiving/gripping the object using the effector;
   - 1.2 moving the object using the robot manipulator along the inserting trajectory $\vec{T}$ into the object-receiving area while continuously performing predetermined tilting motions of the object that are closed and cyclical motions relative to the target orientation $O_{soll}(\vec{R}_T)$ via a force-regulated and/or impedance-regulated control of the robot manipulator, until:
      - a specific threshold condition G1 for a torque acting on the effector and/or a force acting on the effector is reached or exceeded, and/or
      - a provided force/torque signature and/or a position/speed signature on the effector is reached or exceeded, which indicate(s) that the object has been completely successfully inserted into the object-receiving area within specified tolerances;
   - 1.3 releasing the object by the effector; and
   - 1.4 moving the effector away from the object-receiving area using the robot manipulator along a specified exit trajectory A.

2. The method according to claim 1, wherein releasing the object in step 1.3 takes place by continuously performing force-regulated and/or impedance-regulated tilting motions.

3. The method according to claim 1, further comprising making translational lateral motions of the effector with the object in step 1.2 and/or step 1.3 around the inserting trajectory T/exit trajectory A.

4. The method according to claim 1, wherein the tilting motions in step 1.2 and/or in step 1.3 tilt the object around one, two, or three tilting axes relative to the target orientation $O_{soll}(\vec{R}_T)$, such that the tilting of the object around the tilting axis is by an angle in a range of up to ±1°, ±2°, ±5°, ±7°, ±10°, ±12°, ±15° to the target orientation $O_{soll}(\vec{R}_T)$.

5. The method according to claim 1, wherein, if during the receiving/gripping of the object by the effector in step 1.1 an error should occur, repeating the receiving/gripping of the object by the effector with different parameters for receiving/gripping the object.

6. The method according to claim 1, wherein, to an extent that an error should occur when the object is moved by the robot manipulator along the inserting trajectory T in the inserting direction into the object-receiving area, repeating moving the object using the robot manipulator into the object-receiving area along a modified inserting trajectory T* and/or with modified parameters for the force-regulated and/or impedance-regulated tilting motions of the object relative to the target orientation $O_{soll}(\vec{R}_T)$.

7. A robot with an actuator-driven robot manipulator to insert an object into an object-receiving area, wherein the robot manipulator has an effector at its distal end, designed to receive and/or grip the object, and wherein an inserting trajectory T is defined for the object-receiving area and the object to be inserted, and a target orientation $O_{soll}(\vec{R}_T)$ of the object to be inserted is defined along the inserting trajectory T for locations $\vec{R}_T$ of the inserting trajectory T, the robot comprising a control unit designed to perform operations comprising:
   - 11.1 receiving/gripping the object using the effector;
   - 11.2 moving the object using the robot manipulator along the inserting trajectory $\vec{T}$ into the object-receiving area while continuously performing predetermined tilting motions of the object that are closed and cyclical motions relative to the target orientation $O_{soll}(\vec{R}_T)$ via a force-regulated and/or impedance-regulated control of the robot manipulator, until:
      - a specific threshold condition G1 for a torque acting on the effector and/or a force acting on the effector is reached or exceeded, and/or
      - a provided force/torque signature and/or a position/speed signature on the effector is reached or exceeded, which indicate(s) that the object has been completely successfully inserted into the object-receiving area within specified tolerances;
   - 11.3 releasing the object by the effector; and
   - 11.4 moving the effector away from the object-receiving area using the robot manipulator along a specified exit trajectory A.

8. The robot according to claim 7, wherein the releasing the object in operation 11.3 takes place by continuously performing force-regulated and/or impedance-regulated tilting motions.

9. The robot according to claim 7, further comprising making translational lateral motions of the effector with the object in operation 11.2 and/or operation 11.3 around the inserting trajectory T/exit trajectory A.

10. The robot according to claim 7, wherein the tilting motions in operation 11.2 and/or in operation 11.3 rotate or tilt the object around one, two, or three tilting axes relative to the target orientation $O_{soll}(\vec{R}_T)$, such that the tilting of the object around the tilting axis is by an angle in a range of up to ±1°, ±2°, ±5°, ±7°, ±10°, ±12°, ±15° to the target orientation $O_{soll}(\vec{R}_T)$.

11. The robot according to claim 7, wherein, if during the receiving/gripping of the object by the effector in operation 11.1 an error should occur, repeating the receiving/gripping of the object by the effector with different parameters for receiving/gripping the object.

12. The robot according to claim 7, wherein, to an extent that an error should occur when the object is moved by the robot manipulator along the inserting trajectory T in the inserting direction into the object-receiving area, repeating movement of the object using the robot manipulator into the object-receiving area along a modified inserting trajectory T* and/or with modified parameters for the force-regulated and/or impedance-regulated tilting motions of the object relative to the target orientation $O_{soll}(\vec{R}_T)$.

13. A system to insert an object into an object-receiving area by an actuator-driven robot manipulator of a robot and control the robot manipulator, wherein the robot manipulator has an effector at its distal end, designed to receive and/or grip the object, and wherein an inserting trajectory T is defined for the object-receiving area and the object to be inserted, and a target orientation $O_{soll}(\vec{R}_T)$ of the object to be inserted is defined along the inserting trajectory T for locations $\vec{R}_T$ of the inserting trajectory T, the system comprising:
   a data processing device; and
   storage medium storing instructions that, when executed by the data processing device, cause the data processing device to perform operations comprising:
      11.1 receiving/gripping the object using the effector;
      11.2 moving the object using the robot manipulator along the inserting trajectory T into the object-receiving area while continuously performing predetermined tilting motions of the object that are closed and cyclical motions relative to the target orientation $O_{soll}(\vec{R}_T)$ via a force-regulated and/or impedance-regulated control of the robot manipulator, until:
         a specific threshold condition G1 for a torque acting on the effector and/or a force acting on the effector is reached or exceeded, and/or
         a provided force/torque signature and/or a position/speed signature on the effector is reached or exceeded, which indicate(s) that the object has been completely successfully inserted into the object-receiving area within specified tolerances;
      11.3 releasing the object by the effector; and
      11.4 moving the effector away from the object-receiving area using the robot manipulator along a specified exit trajectory A.

14. A non-transitory storage medium storing instructions to insert an object into an object-receiving area, wherein the robot manipulator has an effector at its distal end, designed to receive and/or grip the object, and wherein an inserting trajectory T is defined for the object-receiving area and the object to be inserted, and a target orientation $O_{soll}(\vec{R}_T)$ ° f the object to be inserted is defined along the inserting trajectory T for locations $\vec{R}_T$ of the inserting trajectory T, the instructions when executed by a data processing device cause the data processing device to perform operations comprising:
   11.1 receiving/gripping the object using the effector;
   11.2 moving the object using the robot manipulator along the inserting trajectory T into the object-receiving area while continuously performing predetermined tilting motions of the object that are closed and cyclical motions relative to the target orientation $O_{soll}(\vec{R}_T)$ via a force-regulated and/or impedance-regulated control of the robot manipulator, until:
      a specific threshold condition G1 for a torque acting on the effector and/or a force acting on the effector is reached or exceeded, and/or
      a provided force/torque signature and/or a position/speed signature on the effector is reached or exceeded, which indicate(s) that the object has been completely successfully inserted into the object-receiving area within specified tolerances;
   11.3 releasing the object by the effector; and
   11.4 moving the effector away from the object-receiving area using the robot manipulator along a specified exit trajectory A.

* * * * *

UNITED STATES PATENT AND TRADEMARK OFFICE
CERTIFICATE OF CORRECTION

PATENT NO. : 11,203,119 B2
APPLICATION NO. : 16/095626
DATED : December 21, 2021
INVENTOR(S) : Sami Haddadin Page 1 of 2

It is certified that error appears in the above-identified patent and that said Letters Patent is hereby corrected as shown below:

On the Title Page

IN THE ABSTRACT:
Line 12:
Now reads: "trajectory $\vec{T}$ into the object-receiving area while continuously"
Should read: -- trajectory T into the object-receiving area while continuously --

In the Specification

Column 4, Line 42:
Now reads: "manipulator along the inserting trajectory $\vec{T}$ into the"
Should read: -- manipulator along the inserting trajectory T into the --

In the Claims

Claim 1, Column 5, Line 30:
Now reads: "the inserting trajectory $\vec{T}$ into the object-receiving area"
Should read: -- the inserting trajectory T into the object-receiving area --

Claim 7, Column 6, Line 15:
Now reads: "orientation $O_{soll}$ ($\vec{R}_T$) ° f"
Should read: -- orientation $O_{soll}$ ($\vec{R}_T$) of --

Claim 7, Column 6, Line 22:
Now reads: "the inserting trajectory $\vec{T}$ into the object-receiving area"
Should read: -- the inserting trajectory T into the object-receiving area --

Signed and Sealed this
Thirty-first Day of May, 2022

Katherine Kelly Vidal
*Director of the United States Patent and Trademark Office*

Claim 14, Column 8, Line 10:
Now reads: "orientation $O_{soll}(\vec{R}_T) \circ f$"
Should read: -- orientation $O_{soll}(\vec{R}_T)$ of --

Claim 14, Column 8, Line 17:
Now reads: "the inserting trajectory $\vec{T}$ into the object-receiving area"
Should read: -- the inserting trajectory T into the object-receiving area --